United States Patent
Amburgey

(10) Patent No.: US 7,607,903 B2
(45) Date of Patent: Oct. 27, 2009

(54) STATOR TUBE REMOVAL AND INSTALLATION DEVICE

(75) Inventor: Michael Duane Amburgey, London, OH (US)

(73) Assignee: Moyno, Inc., Springfield, OH (US)

( * ) Notice: Subject to any disclaimer, the term of this patent is extended or adjusted under 35 U.S.C. 154(b) by 713 days.

(21) Appl. No.: 11/118,271

(22) Filed: Apr. 29, 2005

(65) Prior Publication Data

US 2005/0191188 A1    Sep. 1, 2005

Related U.S. Application Data

(62) Division of application No. 10/434,383, filed on May 8, 2003, now Pat. No. 6,912,764, which is a division of application No. 09/998,104, filed on Nov. 30, 2001, now Pat. No. 6,622,381.

(51) Int. Cl.
    *B23P 15/00*      (2006.01)
    *B23P 19/04*      (2006.01)
    *E21B 31/06*      (2006.01)
    *E21B 43/00*      (2006.01)
    *F01C 13/00*      (2006.01)
    *F04B 17/00*      (2006.01)

(52) U.S. Cl. ............... 418/39; 29/244; 29/272; 29/888.02; 166/98; 166/68.05; 417/360; 417/410.4

(58) Field of Classification Search .............. 29/244, 29/247, 250, 255, 272, 888.02; 166/68.5, 166/98; 417/360, 410.4; 418/39, 220
See application file for complete search history.

(56) References Cited

U.S. PATENT DOCUMENTS

| | | | |
|---|---|---|---|
| 778,881 A | 1/1905 | Mouton | |
| 883,773 A | 4/1908 | Ashmore | |
| 1,633,237 A * | 6/1927 | Whitlow | 29/249 |
| 2,085,115 A | 6/1937 | Moineau | |
| 2,512,764 A | 6/1950 | Byram | |
| 2,612,845 A | 10/1952 | Byram et al. | |
| 2,733,854 A * | 2/1956 | Chan | 418/48 |
| 2,957,427 A | 10/1960 | O'Connor | |
| 2,970,810 A | 2/1961 | Zich et al. | |
| 3,095,181 A * | 6/1963 | Dromboski | 254/105 |
| 3,567,183 A * | 3/1971 | Voss | 254/93 H |
| 3,727,724 A * | 4/1973 | Gilbert et al. | 182/198 |
| 3,880,604 A | 4/1975 | Hawkins | |
| 4,212,450 A | 7/1980 | Lambert | |
| 4,768,835 A | 9/1988 | Kalantarov et al. | |

(Continued)

*Primary Examiner*—David P Bryant
*Assistant Examiner*—Alexander P Taousakis
(74) *Attorney, Agent, or Firm*—Thompson Hine LLP

(57) ABSTRACT

An apparatus for removing a stator tube from a position about a rotor of a progressing cavity pump is provided. The apparatus includes an actuator assembly having a base and a piston which is longitudinally displaceable relative to the base, and a pusher rod. The base of the actuator assembly is removably attachable to a discharge end of the stator tube. The pusher rod is longitudinally releasably attachable to the piston at a plurality of locations along the length of the pusher rod and is located to engage the rotor when the base is coupled to the stator tube. The pusher rod is coupled to the piston and the piston is driven by the actuator assembly. With only slight modifications the apparatus may also be used to install the stator tube on the rotor when operated in a substantially opposite way.

20 Claims, 10 Drawing Sheets

U.S. PATENT DOCUMENTS

| | | | |
|---|---|---|---|
| 5,015,162 A * | 5/1991 | Heppner | 418/48 |
| 5,117,546 A | 6/1992 | Lawrence et al. | |
| 5,233,740 A * | 8/1993 | Chen | 29/252 |
| 5,419,027 A * | 5/1995 | McPeak et al. | 29/252 |
| 5,857,842 A * | 1/1999 | Sheehan | 417/420 |
| 5,871,051 A * | 2/1999 | Mann | 166/377 |
| 5,988,992 A * | 11/1999 | Tetzlaff et al. | 417/360 |
| 6,120,267 A | 9/2000 | Cunningham | |
| 6,358,027 B1 | 3/2002 | Lane | |
| 6,729,391 B2 * | 5/2004 | Hill et al. | 166/68.5 |
| 6,895,646 B1 * | 5/2005 | Houg | 29/252 |
| 6,912,764 B2 * | 7/2005 | Amburgey | 29/252 |
| 6,925,696 B1 * | 8/2005 | Williams | 29/252 |
| 7,076,851 B2 * | 7/2006 | Rousset | 29/252 |
| 2005/0177988 A1 * | 8/2005 | Williams | 29/252 |

* cited by examiner

STATOR TUBE REMOVAL AND INSTALLATION DEVICE

CROSS-REFERENCE TO RELATED APPLICATIONS

This application is a divisional of application Ser. No. 10/434,383 filed May 8, 2003, which is a divisional of application Ser. No. 09/998,104 filed Nov. 30, 2001, now U.S. Pat. No. 6,622,381 the contents of which are hereby incorporated by reference.

TECHNICAL FIELD

The present disclosure relates generally to progressing cavity pumps, and more particularly, to a device for removing and/or installing the stator tube of a progressing cavity pump.

BACKGROUND

A conventional progressing cavity pump system, which can be used to pump a wide range of fluids, typically includes an inlet chamber or suction chamber, and a generally cylindrical stator tube having a discharge port. The pump may include a rotor and a stator located inside the stator tube and having an internal bore extending longitudinally therethrough. The rotor may be rotationally disposed in the internal bore of the stator tube. The stator may be in the form of a double lead helical nut, in which case the stator may include a pair of internal helical grooves which define the internal bore. Likewise, the rotor may be a single lead helical screw rotor including one external helical lobe. The rotor may be rotationally disposed within the internal bore so that the external helical lobe of the rotor and the internal helical grooves of the stator define a plurality of cavities therebetween. The stator is typically formed from a resilient and flexible elastomeric material, and the rotor is typically manufactured from a metallic material. The rotor may be rotatably driven by a drive shaft which may be coupled to the rotor by a universal joint as is well known to those skilled in the cavity pump art. For additional information regarding the operation and construction of progressing cavity pumps, reference can be made to U.S. Pat. No. 2,512,764, U.S. Pat. No. 2,612,845, and U.S. Pat. No. 6,120,267.

As the rotor is rotatably driven within the stator bore, the cavities formed between the rotor and the stator progress from the suction end of the stator tube to the discharge end of the stator tube. In one revolution of the rotor, two separate sets of cavities are formed, with one set of cavities being formed or opening at exactly the same rate as the second set of cavities are closing. This pumping process results in a predictable, pulsationless flow of the fluid.

Because the stator is typically made from an elastomeric material, the stator may experience wear after a period of use. Therefore, it may be desirable to remove the stator tube and stator from the progressing cavity pump system for reconditioning or replacement. Accordingly, there is a need for a device for assisting in the removal and installation of a stator tube of a progressing cavity pump.

SUMMARY

In one embodiment, the invention is an apparatus for removing a stator tube from a position about a rotor of a progressing cavity pump, the rotor being rotatable relative to the stator tube to pump material through the stator tube. The apparatus includes an actuator assembly having a base and a piston which is displaceable relative to the base along a first axis, and a pusher rod. The base of the actuator assembly is removably attachable to a discharge end of the stator tube. The pusher rod is releasably attachable to the piston along the first axis at a plurality of locations along the pusher rod and is located to engage the rotor when the base is coupled to the stator tube, the pusher rod is coupled to the piston and the piston is driven by the actuator assembly.

The apparatus generally operates by pulling the stator tube off of the rotor while using the rotor as a fixed ground point which provides a resistive force. By adjusting the position of the pusher rod with respect to the piston along the first axis, the actuator assembly has an adjustable working length to enable the stator tube to be removed from the rotor of the progressing cavity pump.

Other objects and advantages will be apparent from the following description and the accompanying drawings.

DETAILED DESCRIPTION

Figure 1:
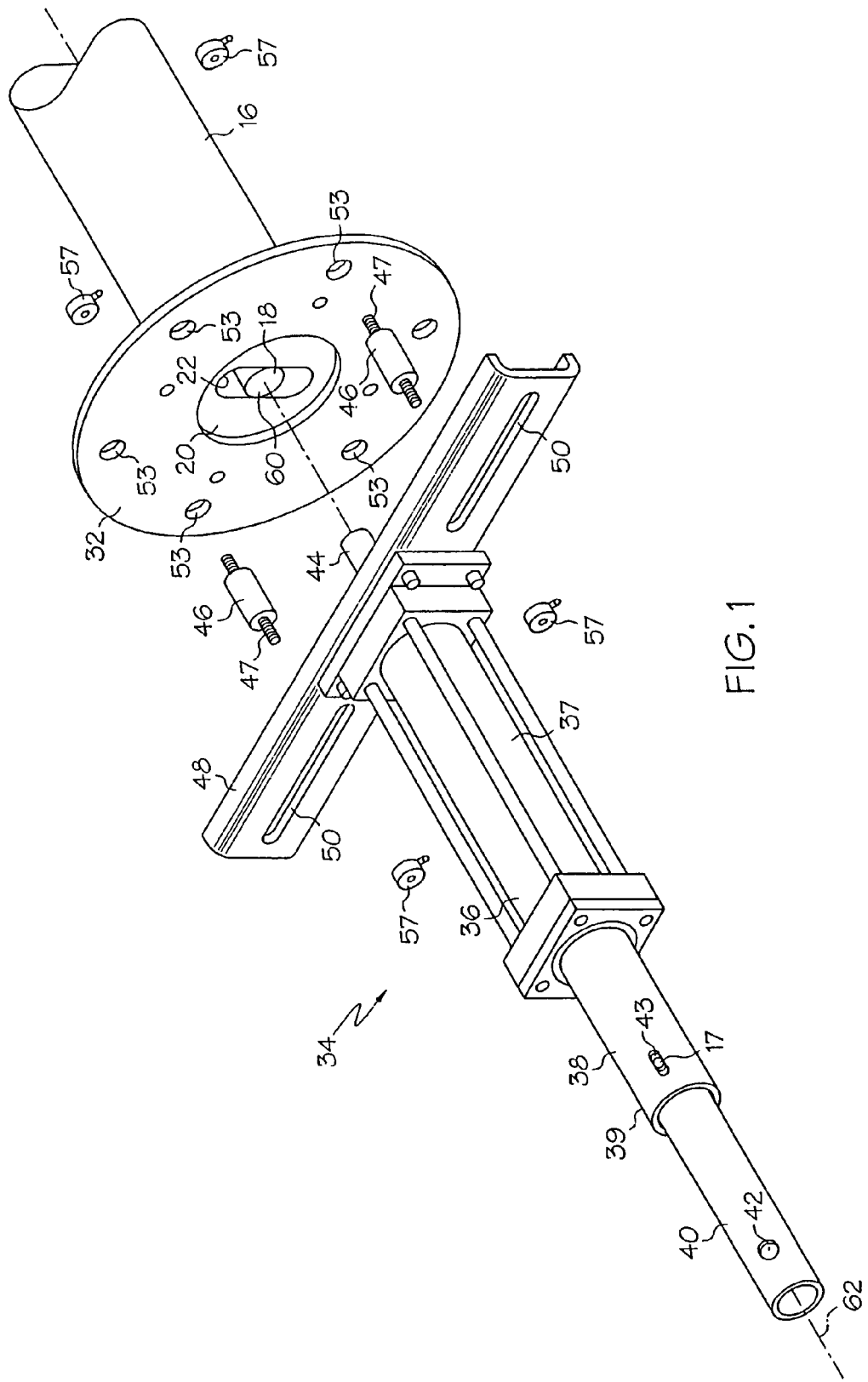
FIG. 1 is a front perspective partially exploded view of one embodiment of the stator tube removal/installation device of the present invention shown in conjunction with a stator tube.
Figure 2:
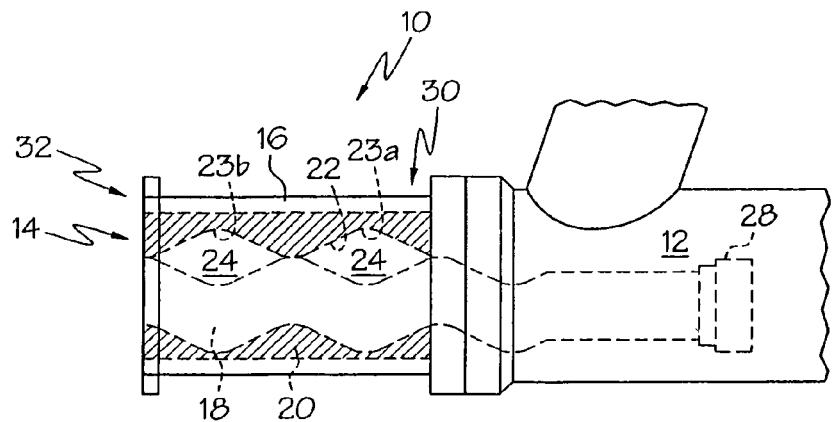
FIG. 2 is a side partial cross section view of a conventional progressing cavity pump.

As shown in FIGS. 1 and 2, a conventional progressing cavity pump system, generally designated 10, may include an inlet chamber or suction chamber 12 and a cylindrical stator tube 16 having a discharge port 14. The stator tube 16 includes a suction end 30 that is coupled to, and in fluid communication with the inlet chamber 12. The pump 10 may further include a rotor 18 and a stator 20 located inside the stator tube 16, the stator tube 16 having an internal bore 22 extending longitudinally therethrough. The stator 20 may be in the form of a double lead helical nut, in which case the stator 20 may include a pair of internal helical grooves 23a, 23b which define the internal bore 22. Likewise, the rotor 18 may be a single lead helical screw rotor including one external helical lobe. The rotor 18 may be rotationally disposed within the internal bore 22 so that the external helical lobe of the rotor 18 and the internal helical grooves of the stator 23a, 23b define a plurality of cavities 24 therebetween. The stator 20 is typically formed from a resilient and flexible elastomeric material, and the rotor 18 is typically manufactured from a metallic material. The rotor 18 may be rotatably driven by a drive shaft (not shown) which may be coupled to the rotor 18 by a universal joint 28 as is well known to those skilled in the cavity pump art.

As the rotor 18 is rotatably driven within the stator bore 22, the cavities 24 formed between the rotor 18 and the stator 20 progress from the suction end 30 of the stator tube 16 to the discharge end 32 of the stator tube 16. In one revolution of the rotor 18, two separate sets of cavities are formed, with one set of cavities being formed or opening at exactly the same rate as the second set of cavities are closing. This pumping procedure results in a predictable, pulsationless flow of the fluid.

Because the stator 20 is typically made from an elastomeric material, the stator 20 may experience wear after a period of use. Therefore, it may be desirable to remove the stator tube 16 and stator 20 from the progressing cavity pump system 10 for reconditioning or replacement.

FIG. 1 illustrates one embodiment of an apparatus 34 for removing or installing the stator tube 16. The stator tube removal/installation device 34 may include an actuator assembly 36 having a base 37 and a piston 38 which is longitudinally displaceable relative to the base 37 along a first axis 62. The base 37 may include a cross bar 48 which includes a pair of opposed slots 50 which are shaped and located to receive a fastener 47 therethrough to couple the base 37 to the discharge end 32 of the stator tube 16. The fasteners 47 that are used to couple the base 37 and cross bar 48 to the stator tube 16 may include spacers 46 located thereon for spacing the base 37 from the stator tube 16 when the base 37 is coupled to the stator tube 16.

Figure 3:
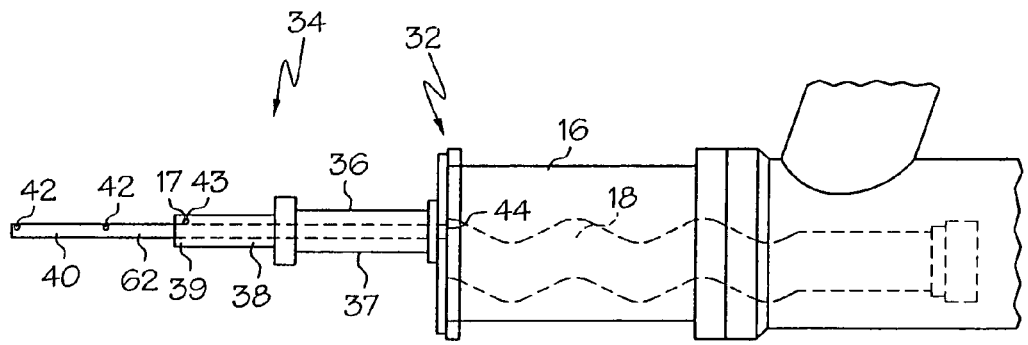
FIG. 3 is a side view of one embodiment of the stator tube removal/installation device of the present invention mounted to the progressing cavity pump of FIG. 2, wherein the base of the stator tube removal/installation device is attached to the discharge end of the stator tube and the working end of the pusher rod is positioned adjacent to the discharge end of the rotor.
Figure 4:
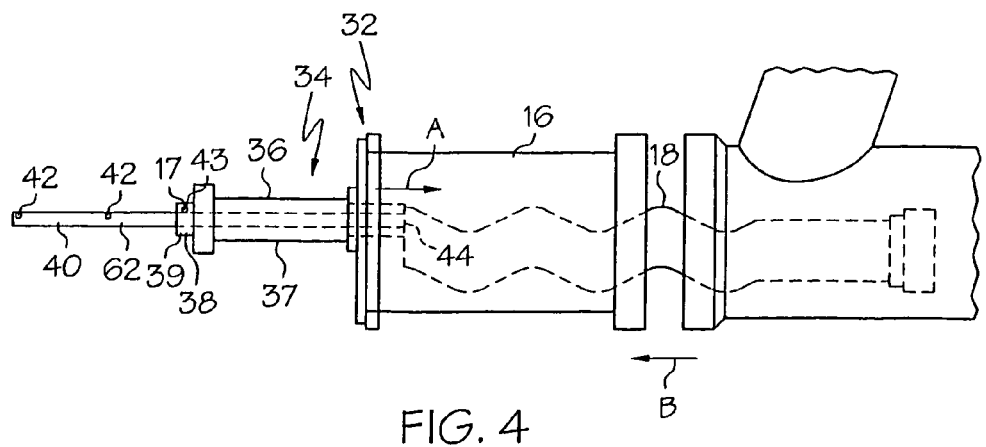
FIG. 4 is a side view of the stator tube removal/installation device and progressing cavity pump of FIG. 3, wherein the piston of the stator tube removal/installation device is in a retracted position and wherein the base and stator tube are spaced away from the rotor.
Figure 5:
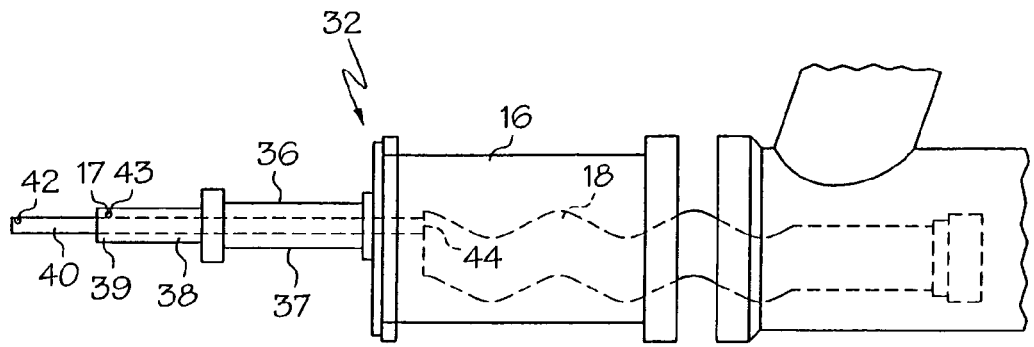
FIG. 5 is a side view of the stator tube removal/installation device and progressing cavity pump of FIG. 4, wherein the piston of the stator tube removal/installation device is in an extended position.
Figure 6:
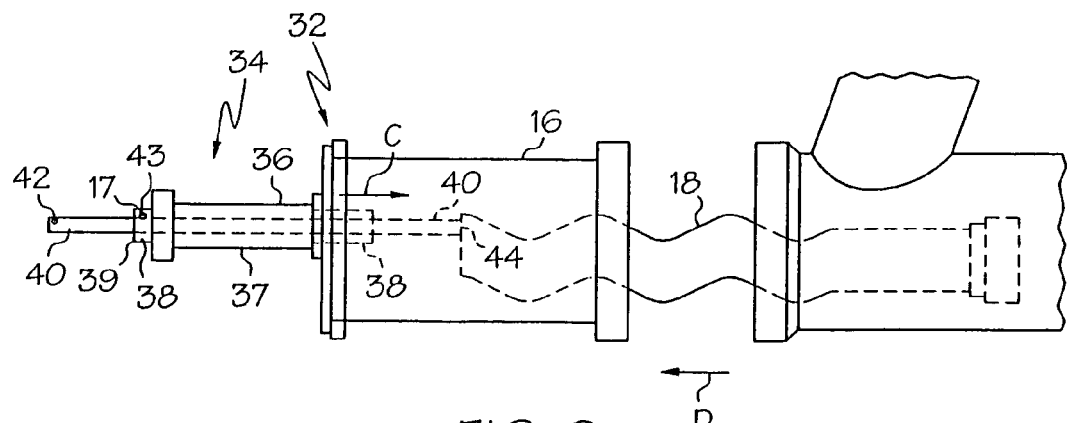
FIG. 6 is a side view of the stator tube removal/installation device and progressing cavity pump of FIG. 5, wherein the piston of the stator tube removal/installation device is in a retracted position.

The piston 38 can be driven by the base 37 along the first axis 62 between an extended position, shown in FIGS. 3 and 5, and a retracted position, shown in FIGS. 4 and 6. When the actuator assembly 36 is in the retracted position a distal end 39 of the piston 38 (which is the end of the piston 38 that is located farthest from the stator tube 16 when the actuator assembly 36 is mounted to the stator tube 16) is located adjacent to the base 37. When the actuator assembly 36 is in the extended position the distal end 39 of the piston 38 is spaced away from the base 37 along the first axis 62, preferably at the outer limit of the range of motion of the piston 38 along the first axis 62. The movement of driving the piston 38 from an extended position to the retracted position or from the retracted position to an extended position is termed a stroke, and the distance that the piston 38 moves between the extended position and the retracted position, or vice versa, is termed a stroke length.

In the embodiment shown in FIG. 1, the actuator assembly 36 is a hydraulic cylinder assembly and the piston 38 is a hollow piston. However, various other actuators may be used to drive the piston 38, including but not limited to pneumatic, electrically-powered and non-cylindrical drivers. Additionally, although the piston 38 is shown and described as tubular, the piston 38 need not be hollow or have a circular cross section.

The stator tube removal/installation device 34 shown in FIG. 1 includes a pusher rod 40 that is received in and is concentric with the piston 38. The pusher rod 40 is releasably attachable to the piston 38 along the first axis 62 at a plurality of locations along the pusher rod 40. In the embodiment shown in FIG. 1, the pusher rod 40 has a length that is at least greater than a length of the piston 38 and includes a plurality of keyholes 42 spaced apart along the axial length of the pusher rod 40 by a distance about equal to a stoke length of the actuator assembly 36. The piston 38 may also include a keyhole 43 located near its distal end 39. Accordingly, the pusher rod 40 can be releasably coupled to the piston 38 for movement along the first axis 62 by aligning one of the keyholes 42 of the pusher rod 40 with the keyhole 43 of the piston 38, and pushing a pin 17 through the aligned keyholes 42, 43.

As noted above, the pusher rod 40 need not possess a circular cross section, and the pusher rod 40 need not be received in the piston 38. For example, the pusher rod 40 and the piston 38 may be positioned side by side or located in other arrangements. Additionally, any of a variety of methods or structures of coupling the piston 38 and pusher rod 40 may be used without departing from the scope of the invention such as clamps, fasteners, friction, and various inter-engaging geometries.

In order to remove the stator tube 16 of the pump 10 from the rotor 18, the base 37 of the actuator assembly 36 is coupled to the discharge end 32 of the stator tube 16 such that the base 37 is located between the distal end 39 of the piston 38 and the stator tube 16. The actuator assembly 36 should be coupled to the stator tube 16 to prevent the actuator assembly 36 from pushing itself away from the stator tube 16 when the actuator assembly 36 is activated. In one embodiment, a threaded fastener 47 is passed through each of the slots 50 and through an opening 53 of the discharge end 32 of the stator tube 16, and nuts 57 are threaded onto each end of the fasteners 47. The spacers 46 on the fasteners 47 provide a gap between the stator tube 16 and the actuator assembly 36 which may permit an operator to visually align the working end 44 of the pusher rod 40 with the discharge end of the rotor 18 as the base 37 is mounted to the stator tube 16. Next, the stator tube 16 is disconnected from the progressing cavity pump system 10 (i.e. disconnected from the inlet chamber 12). The piston 38 is then moved to its extended position, and the pusher rod 40 is coupled to the piston 38 such that the working end 44 of the pusher rod 40 is located and adjacent to the rotor 18, as shown in FIG. 3. Accordingly, as shown, the base 37 of the actuator assembly 36 is located between the working end 44 of the pusher rod 40 and the distal end 39 of the piston 38.

The actuator assembly 36 is then activated or stroked such that the piston 38 and associated pusher rod 40 are moved in the direction of arrow A toward the discharge end of the rotor 18. Because the rotor 18 is either fixed along the first axis 62 or because the rotor 18 and associated progressing cavity pump system 10 possess a great deal more mass than the stator tube 16 and base 37, when the working end 44 of the pusher rod 40 engages the discharge end of the rotor 18, the rotor 18 will exert a resistive force on the working end 44 of the pusher rod 40. As a result of force exerted on the piston 38 by the actuator assembly 36, the base 37 and associated stator tube 16 will be pulled in the direction of arrow B toward the distal end 39 of the piston 38 and away from the rotor 18. The step of activating or stroking the actuator assembly 36 is then continued until the piston 38 is moved from its extended position (FIG. 3) to its retracted position (FIG. 4). During this time, the stator tube 16 is pushed at least partially off of the rotor 18 by a distance approximately equal to a the stroke length of the actuator assembly 36. Due to the shape of the rotor 18 and stator tube 16, the stator tube 16 and the stator tube removal/installation device 34 may be rotated about the first axis 62 as the stator tube 16 is pulled off of the rotor 18.

In the embodiment shown in FIGS. 1-7, the stroke length of the actuator assembly 36 is shorter than the length of the stator tube 16, in which case the stator tube 16 cannot be removed from its position about the rotor 18 in a single stroke. Accordingly, the stator tube removal/installation device 34 must pull the stator tube 16 from its position about the rotor 18 in a series of repeated steps. To accomplish the removal operation in a series of steps, the stator tube removal/installation device 34 is provided with a variable working length that can be adjusted along the first axis 62 between each stroke of the actuator assembly 36 as the stator tube 16 is incrementally removed. Specifically, a pin connection may be used to enable the position of the pusher rod 40 to be adjusted with respect to the piston 38 along the first axis 62 using the pin connection.

In particular, when the stroke length of the actuator assembly 36 is shorter than the length of the stator tube 16, the stator tube removal/installation device 34 must be adjusted and reactivated in order to fully remove the stator tube 16 from the rotor 18. In this case, the next step in the removal operation is to deactivate the actuator assembly 36 such that the piston 38 reciprocates back from its retracted position to its extended position. Likewise, the pusher rod 40, which is coupled to the piston 38, is carried with the piston 38 and moved away from the rotor 18 such that the working end 44 of the pusher rod 40 no longer engages the discharge end of the rotor 18. Then, as shown in FIG. 5, the pin 17 which couples the pusher rod 40 and the piston 38 is removed and the working end 44 of the pusher rod 40 is moved longitudinally along the first axis 62 such that the pusher rod 40 is located adjacent to the rotor 18. The pin 17 is then passed through the aligned keyholes 42, 43 to couple the pusher rod 40 and piston 38 together. In this manner the working length of the stator tube removal/installation device 34 can be adjusted to accommodate the new position of the stator tube 16 relative to the rotor 18 after the previous stoke of the actuator assembly 36.

Referring to FIG. 6, the next step is to reactivate the actuator assembly 36 such that the piston 38 and pusher rod 40 move in the direction of arrow C. Again, when the working end 44 of the pusher rod 40 engages the discharge end of the rotor 18, the rotor 18 exerts a resistive force which causes the piston 38 to push the base 37 and stator tube 16 in the direction of arrow D toward the distal end 39 of the piston 38 and away from the rotor 18. The step of reactivating or stroking the actuator assembly 36 is continued until the piston 38 is moved from its extended position to its retracted position. Accordingly, the stator tube 16 is again pushed off of the rotor 18 by a distance approximately equal to a the stroke length of the actuator assembly 36.

The steps of deactivating the actuator assembly 36, decoupling the pusher rod 40 and the piston 38, adjusting the longitudinal position of the pusher rod 40 with respect to the piston 38 along the first axis 62, coupling the pusher rod 40 and the piston 38, and reactivating the actuator assembly 36, are then repeated as necessary until the stator tube 16 is completely removed from the rotor 18.

Figure 7:
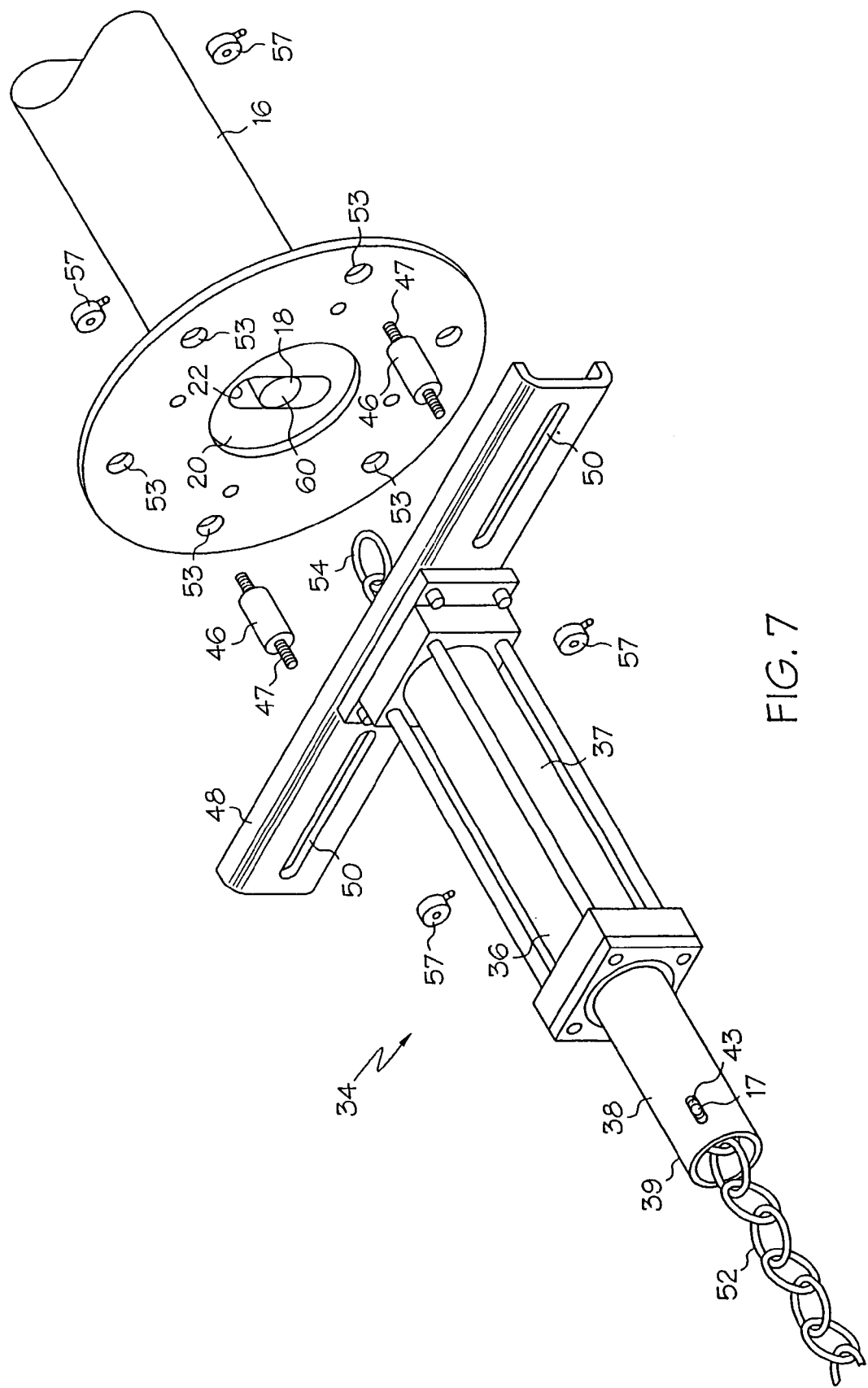
FIG. 7 is a front perspective partially exploded view of another embodiment of the stator tube removal/installation device of the present invention shown in conjunction with a stator tube.

In addition to the previously described removal operation, the stator tube removal/installation device 34 shown in FIG. 1 may be slightly modified and used to install a stator tube 16 onto a rotor 18. Specifically, in order to install the stator tube 16 onto a rotor 18 of a progressing cavity pump system 10 using the stator tube removal/installation device 34, an I-bolt or other attachment mechanism may be installed on the rotor 18 so that a tension member 52 can be attached to the rotor 18. As shown in FIG. 7, the tension member 52 may take the place of the pusher rod 40 when the stator tube removal/installation device 34 is used in an installation operation. In the embodiment shown in FIG. 7 the tension member 52 is a chain. However, the tension member 52 may be nearly any structure that can carry a tension load, such as a rod nearly identical to the pusher rod 40. Nevertheless, a chain may be preferred because each link of the chain provides an opening that can receive a pin therethrough. Furthermore, the tension member 52 is preferably generally flexible at least at its end that is coupled to the rotor 18 to accommodate any movement of the rotor 18 relative to the stator tube 16. If the tension member 18 is not flexible itself, the tension member may otherwise flexibly coupled to the rotor 18. Accordingly, if a rod is used as the tension member, the tension member may include a short length of chain, a universal joint, etc., to provide a flexible connection to the rotor 18. In addition, various other methods and structure for attaching the tension member 52 to the rotor 18 may be used, such as passing the tension member 52 through a hole in the rotor 18, passing the tension member 52 about the rotor 18, etc.

Figure 8:
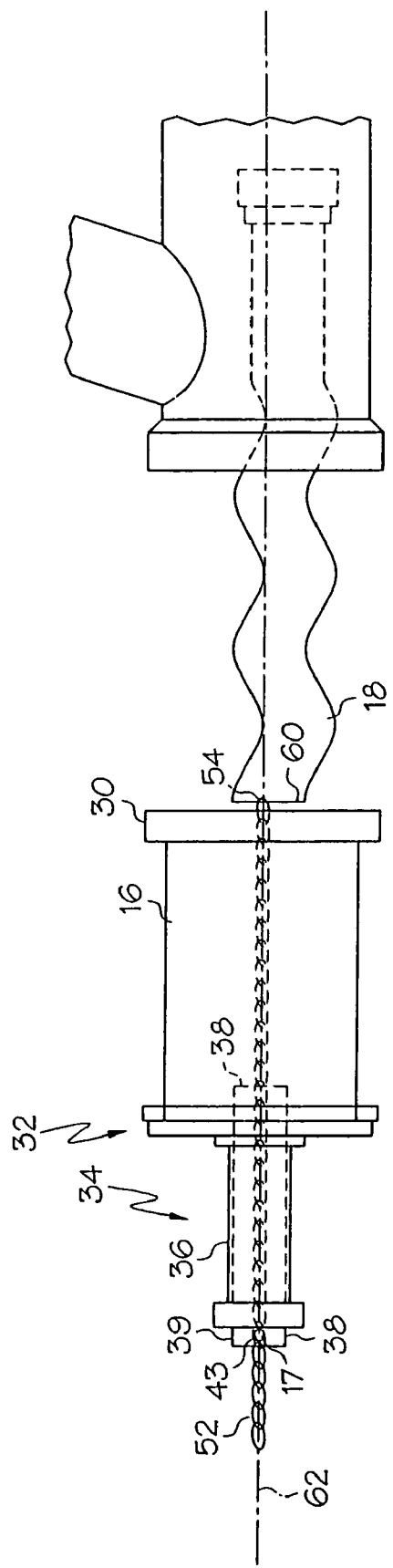
FIG. 8 is a side view of the stator tube removal/installation device and stator tube of FIG. 7, wherein a working end of the tension member of the stator tube removal/installation device is attached to the discharge end of the rotor and the base of the stator tube removal/installation device is attached to the discharge end of the stator tube.
Figure 13:
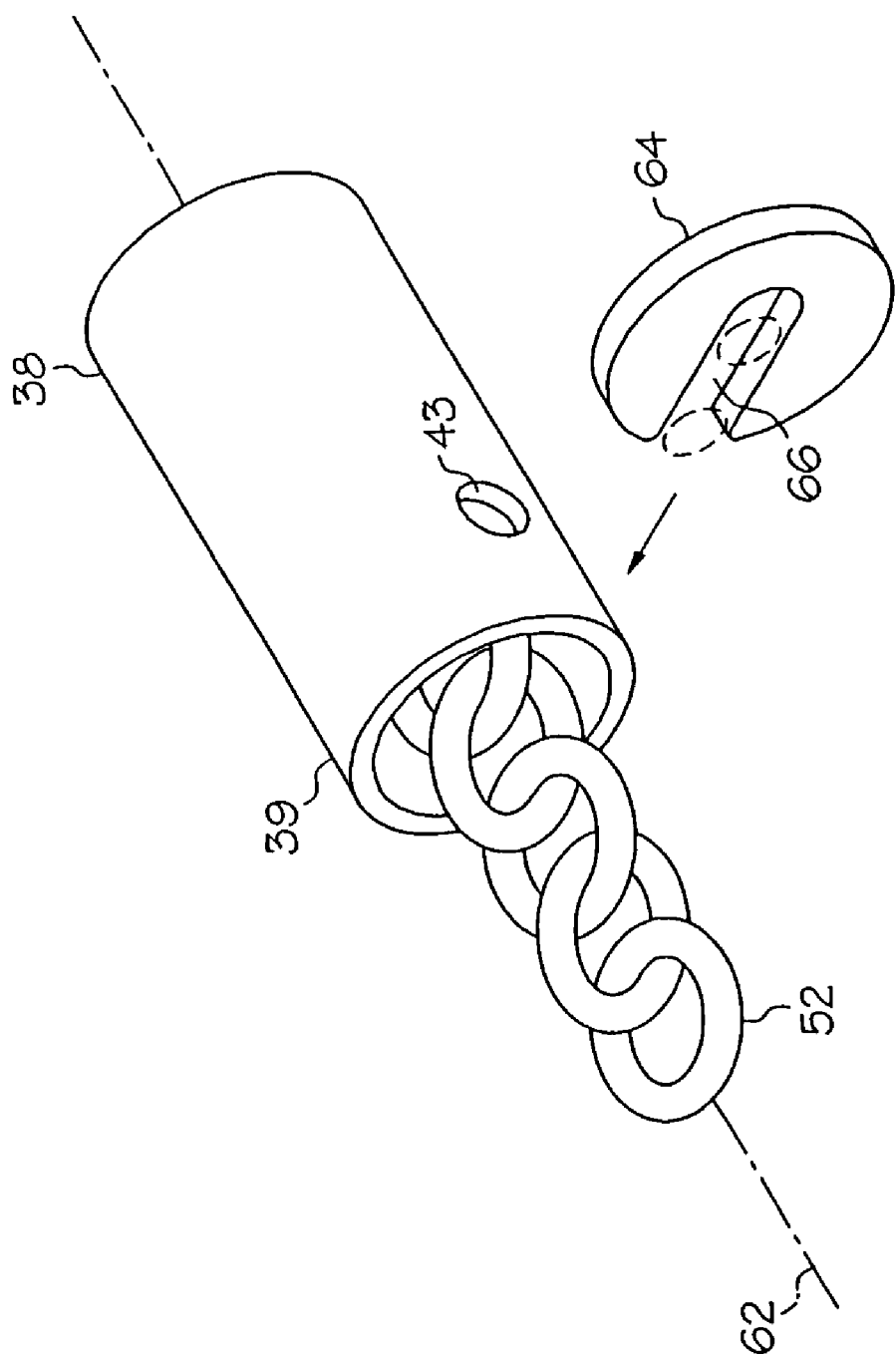
FIG. 13 is a front perspective partially exploded view of the piston of the stator tube removal/installation device of FIG. 7 shown in conjunction with a clip.

In order to install the stator tube 16 on the rotor 18, a working end 54 of the tension member 52 is attached to the rotor 18, preferably at the discharge end 60 (See FIG. 8). The tension member 52 is also passed through the stator tube 16, the actuator assembly 36 and the piston 38. Next the base 37 of the actuator assembly 36 is attached to the discharge end 32 of the stator tube 16 and the suction end 30 of the stator tube 16 is positioned adjacent to the discharge end 60 of the rotor 18. The base 37 is coupled to the stator tube 16 to enable the actuator assembly 36 to remain properly aligned with the rotor 18 during the installation process. The tension member 52 is then coupled to the piston 38 for movement along the first axis 62 by passing the pin 17 through the keyhole 43 and a link in the tension member 52. Of course various other methods or structures for coupling the piston 38 and the tension member 52 may be used. For example, referring to FIG. 13, a clip 64 having an outside dimension that is larger than an outside dimension of the piston 38 and having a slot 66 for receiving a link of the tension member 52 may be slid over a link of the tension member 52 adjacent to the distal end 39 of the piston 38 to prevent movement of the tension member 52 relative to the piston 38 toward the rotor 18 along the first axis 62. The tension member 52 is preferably coupled to the piston 38 such that no more than a small amount of slack exists in the tension member 52 between the attachment to the discharge end of the rotor 18 and the connection to the piston 38.

Figure 9:
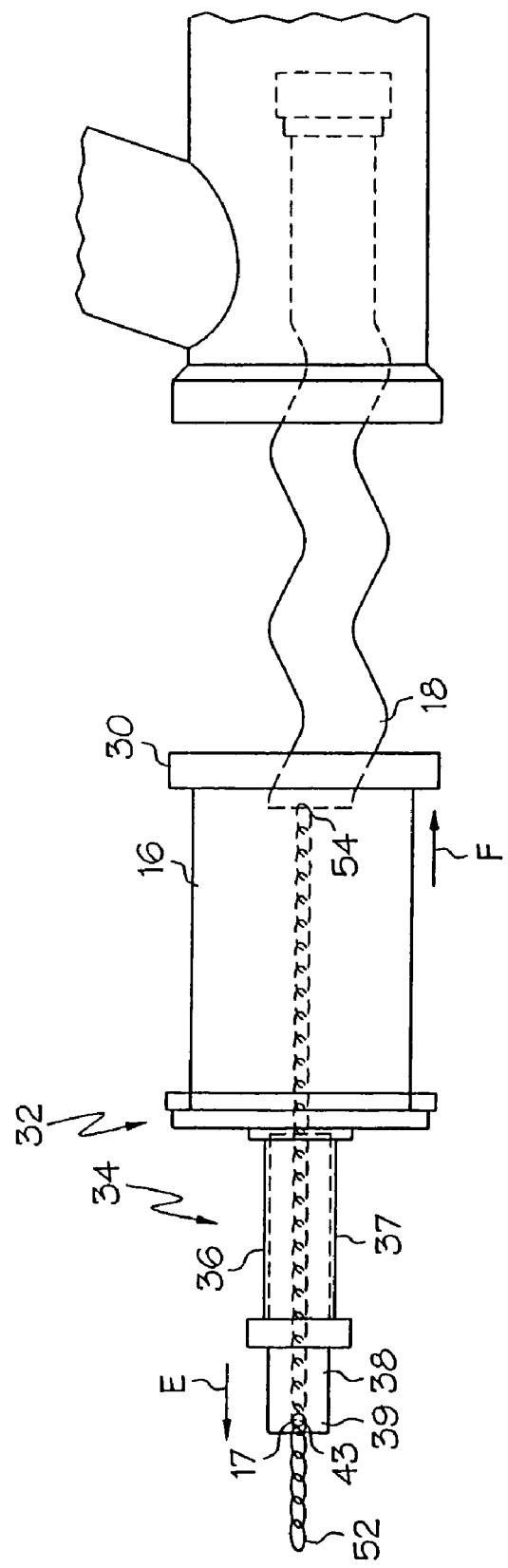
FIG. 9 is a side view of the stator tube removal/installation device and stator tube of FIG. 8, wherein the piston of the stator tube removal/installation device is in an extended position and wherein the base of the stator tube removal/installation device and stator tube are pushed at least partially on the rotor.

Referring to FIG. 9, the next step is to activate or stroke the actuator assembly 36 such that the piston 38 and tension member 52 are moved in the direction of arrow E away from the discharge end of the rotor 18. Because the rotor 18 is either fixed along the first axis 62 or because the rotor 18 and associated progressing cavity pump system 10 possess a great deal more mass than the stator tube 16 and the base 37, when the tension member 52 is pulled tight between the pin connection to the piston 38 and the discharge end 60 of the rotor 18, the rotor 18 exerts a resistive force. As a result of force exerted on the piston 38 by the actuator assembly 36, the base 37 and stator tube 16 will be pushed in the direction of arrow F away from the distal end 39 of the piston 38 and toward the rotor 18. The step of activating or stroking the actuator assembly 36 is then continued until the piston 38 is moved from its retracted position to its extended position. Accordingly, the stator tube 16 is slid on to the rotor 18 for a distance approximately equal to a the stroke length of the actuator assembly 36. The stator tube 16 may be rotated as it slides onto the rotor 18.

Thus, when performing an installation operation, the stator tube removal/installation device 34 pushes the stator tube 16 to a position about the rotor 18 using the rotor 18 as an anchor point. In general, after the tension member 52 is attached to the discharge end 60 of the rotor 18 and the base 37 of the actuator assembly 36 is mounted to the discharge end 32 of the stator tube 16, the tension member 52, which is coupled to the piston 38 via pin 17, is put in tension by driving the piston 38 away from the rotor 18. Then, as a result of force exerted on the piston 38 by the actuator assembly 36 during its stroke, the base 37 and stator tube 16 are forced away from distal end 39 of the piston 38 and toward the rotor 18.

Figure 10:
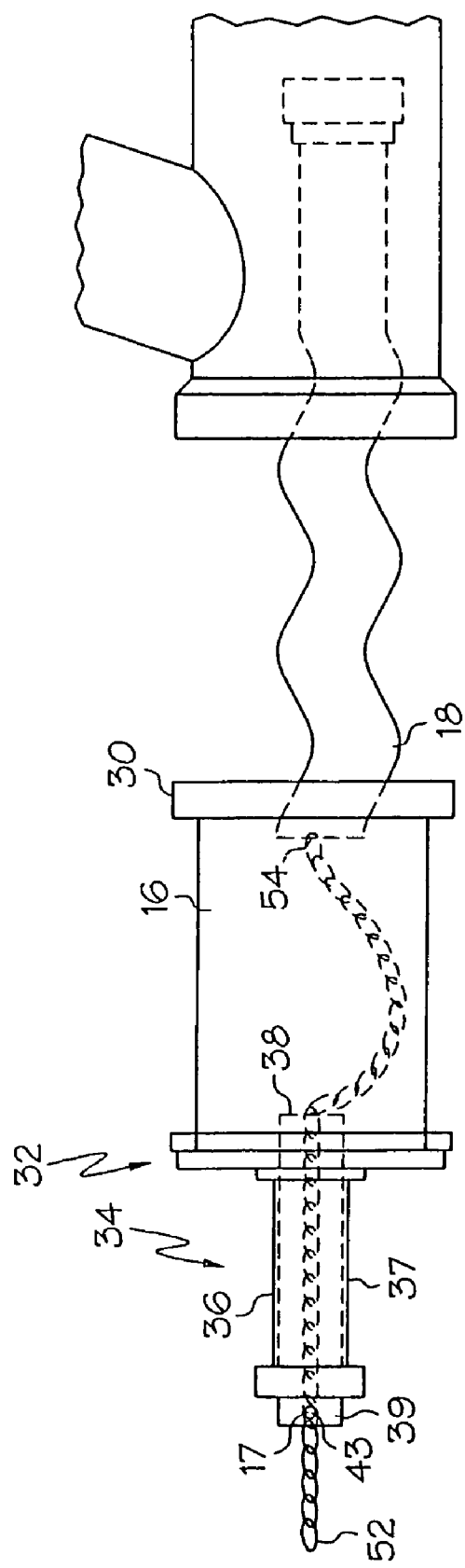
FIG. 10 is a side view of the stator tube removal/installation device and stator tube of FIG. 9, wherein the piston of the stator tube removal/installation device is in a retracted position.
Figure 11:
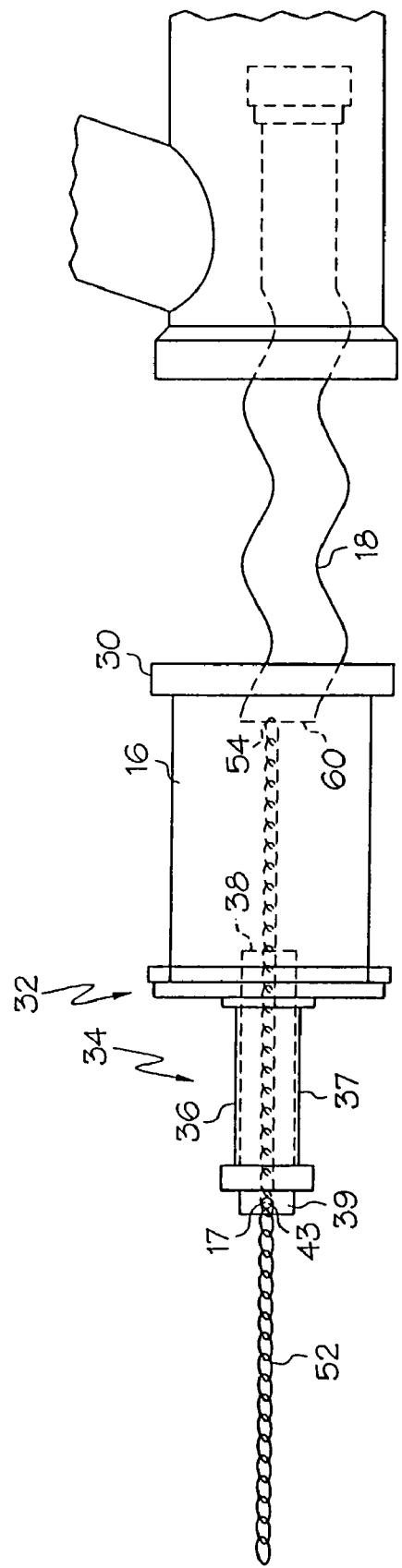
FIG. 11 is a side view of the stator tube removal/installation device and stator tube of FIG. 10, wherein the tension member of the stator tube removal/installation device is longitudinally repositioned with respect to the piston.

Because the stroke length of the actuator assembly 36 may be shorter than the length of the stator tube 16, the stator tube removal/installation device 34 may be required to be adjusted and reactivated in order to fully install the stator tube 16 about the rotor 18. In this case the next step in the installation operation is to deactivate the actuator assembly 36 such that the piston 38 reciprocates back from its extended position to its retracted position (see FIG. 10). Likewise, the distal end of the tension member 52, which is coupled to the piston 38, is moved toward the rotor 18 such that the tension member 52 is slack. Then, as shown in FIG. 11, the pin 17 coupling the tension member 52 and the piston 38 is removed and the tension member 52 is pulled through the piston 38 to remove any slack in the tension member 52. The pin 17 is then repositioned to couple the tension member 52 and the piston 38 together. In this manner the working length of the stator tube removal/installation device 34 can be adjusted to accommodate the new position of the stator tube 16 relative to the rotor 18 after the previous stoke of the actuator assembly 36.

Figure 12:
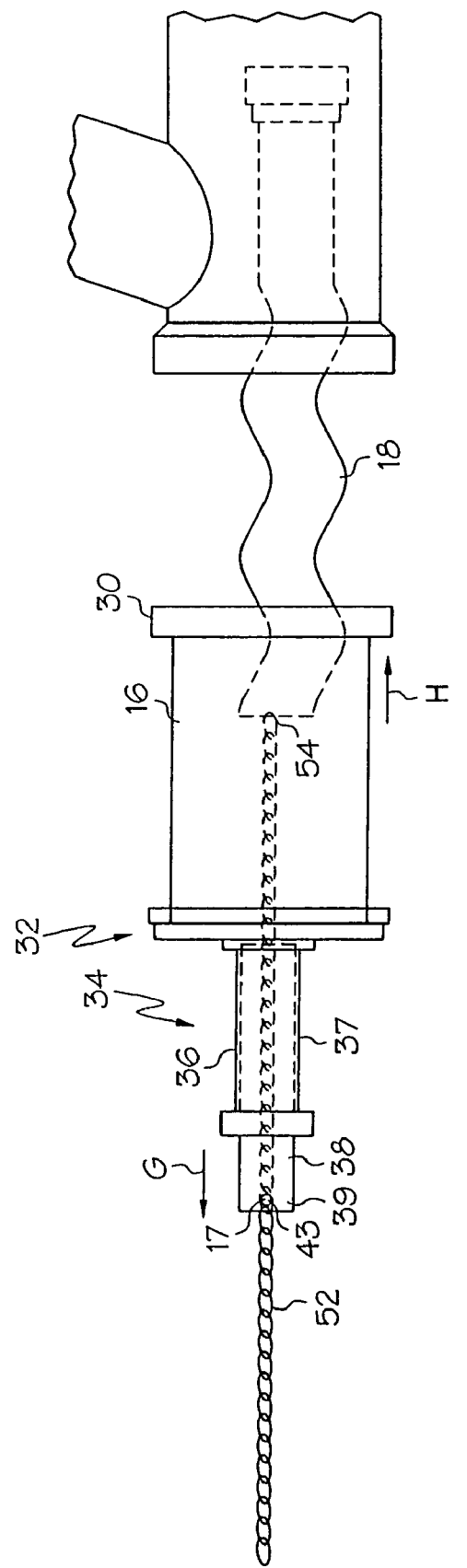
FIG. 12 is a side view of the stator tube removal/installation device and stator tube of FIG. 11, wherein the piston of the stator tube removal/installation device is in an extended position and wherein the base of the stator tube removal/installation device and stator tube are pushed at least partially on the rotor.

Referring to FIG. 12, the next step is to reactivate the actuator assembly 36 such that the piston 38 and pusher rod 40 move in the direction of arrow G. Again, when the tension member 52 is pulled tight between the discharge end of the rotor 18 and the pin connection to the piston 38, the rotor 18 will exert a resistive force. As a result of force exerted on the piston 38 by the actuator assembly 36, the base 37 and associated stator tube 16 will be pushed in the direction of arrow H away from the distal end 39 of the piston 38 and toward the rotor 18. The step of reactivating or stroking the actuator assembly 36 is continued until the piston 38 is moved from its retracted position to its extended position. Accordingly, the stator tube 16 is slid over the rotor 18 for a distance approximately equal to a the stroke length of the actuator assembly 36.

The steps of deactivating the actuator assembly 36, decoupling the tension member 52 and the piston 38, adjusting the longitudinal position of the tension member 52 with respect to the piston 38 along the first axis 62, coupling the tension member 52 and the piston 38, and reactivating the actuator assembly 36, can be repeated as necessary until the stator tube 16 is installed in the desired position about the rotor 18. The stator tube 16 can then be coupled to the suction chamber 12, and the tension member 52 can be uncoupled from the rotor 18. Finally, the stator tube removal/installation device 34 can be uncoupled from the stator tube 16.

Having described the invention in detail and by reference to the preferred embodiment, it will be apparent that modifications and variations thereof are possible without departing from the scope of the invention.

What is claimed is:

1. A pump assembly comprising:
an assembly/disassembly apparatus including an actuator assembly including a base and a piston which is displaceable relative to said base along a first axis, said base being removably attachable to a discharge end of a stator tube and a generally flexible tension member located adjacent to said piston and being releasably attachable to said piston at a plurality of locations along said tension member for movement along said first axis, said tension member being located and configured to be flexibly releasably attached to a rotor when said base is coupled to said stator tube, said tension member is coupled to said piston and said piston is driven by said actuator assembly.

2. The assembly of claim 1 further comprising a progressing cavity pump including a stator tube having a discharge end, said stator tube having a double lead helical cavity therein, said pump including said rotor in the form of a single lead helical screw rotor received in said stator tube, the rotor being rotatable relative to said stator tube to pump material through said stator tube.

3. The assembly of claim 2 wherein said tension member is releasably attached to said rotor.

4. The assembly of claim 2 wherein said tension member is releasably attached to said rotor such that tension forces applied to said tension member are transmitted to said rotor.

5. The assembly of claim 2 wherein said tension member is flexibly releasably attached to said rotor.

6. The assembly of claim 2 wherein said base is removably attached to said discharge end of said stator tube and said tension member is flexibly releasably attached to said rotor.

7. The assembly of claim 1, wherein said tension member includes a rod.

8. The assembly of claim 1, wherein said tension member is a chain.

9. The assembly of claim 8, wherein the apparatus further includes a clip having a slot therein for receiving a link of said chain, said clip having an outer dimension that is larger than an outer dimension of said piston and being removably located adjacent to an end of said piston.

10. The assembly of claim 1, wherein said piston is a hollow cylinder, said tension member is received in said piston, and said actuator assembly includes a hydraulic cylinder assembly.

11. The assembly of claim 1 where said tension member is located and configured such that when said tension member is flexibly releasably attached to a rotor when said base is coupled to said stator tube, and said tension member is coupled to said piston and said piston is driven by said actuator assembly, said tension member is placed in a state of tension.

12. The assembly of claim 1 wherein said tension member is in a state of tension.

13. An assembly comprising:
an assembly/disassembly apparatus including an actuator assembly including a base and a piston which is displaceable relative to said base along a first axis, said base being engageable with a discharge end of a stator tube, the assembly/disassembly apparatus further including a tension member that is releasably attachable to said piston at a plurality of locations along a length of said tension member such that displacement of said piston along said first axis causes displacement of said tension member along said first axis, said tension member being located and configured to be releasably attached to a rotor when said base is coupled to said stator tube, said tension member is coupled to said piston and said piston is driven by said actuator assembly to thereby cause said rotor and stator to move relative to each other along said first axis.

14. The assembly of claim 13 wherein said tension member is generally flexible.

15. The assembly of claim 13 wherein said tension member is located and configured to be flexibly releasably attached to a rotor when said base is coupled to said stator tube, said tension member is coupled to said piston and said piston is driven by said actuator assembly.

16. The assembly of claim 13 further comprising a progressing cavity pump including a stator tube having a discharge end, said stator tube having a double lead helical cavity therein, said pump including said rotor in the form of a single lead helical screw rotor received in said stator tube, the rotor being rotatable relative to said stator tube to pump material through said stator tube.

17. The assembly of claim 16 wherein said tension member is releasably attached to said rotor and in a state of tension.

18. The assembly of claim 16 wherein said tension member is releasably attached to said rotor such that tension forces applied to said tension member are transmitted to said rotor.

19. The assembly of claim 13 wherein at least part of said tension member constitutes a rod or a chain.

20. The assembly of claim 13 wherein said piston is a hollow cylinder, said tension member is received in said piston, and said actuator assembly includes a hydraulic cylinder assembly.

* * * * *